United States Patent [19]

Ryu et al.

[11] Patent Number: 6,093,282
[45] Date of Patent: Jul. 25, 2000

[54] METHOD FOR RECYCLING OF OLD CORRUGATED CONTAINER USING FLOTATION AND ENZYMATIC HYDROLYSIS

[75] Inventors: Jeong Yong Ryu, Daejeon; Kyoung Rak Ji, Choongchungbook-do; Jong-Ho Shin; Say Kyoun Ow, both of Daejeon, all of Rep. of Korea

[73] Assignee: Korea Research Institute of Chemical Technology, Rep. of Korea

[21] Appl. No.: 09/339,820

[22] Filed: Jun. 25, 1999

[30] Foreign Application Priority Data

Jun. 27, 1998 [KR] Rep. of Korea ............... 98-24525

[51] Int. Cl.[7] ....................................... D21B 1/08
[52] U.S. Cl. ........................ 162/4; 162/5; 162/72; 162/189; 435/278
[58] Field of Search .............. 162/4, 5, 72, 189; 435/278; 210/608, 632, 703; 209/162, 172.5

[56] References Cited

U.S. PATENT DOCUMENTS 5,110,412  5/1992  Fuentes et al. .................... 162/5
5,417,806  5/1995  Matzke et al. ..................... 162/4

*Primary Examiner*—Peter Chin
*Assistant Examiner*—Mark Halpern
*Attorney, Agent, or Firm*—Finnegan, Henderson, Farabow, Garrett & Dunner, L.L.P.

[57] ABSTRACT

The present invention relates to a method for recycling of old corrugated container (OCC) using flotation, followed by selective enzymatic treatment to fines portion and by selective refining to long fiber stream, and more particularly, to a method for recycling of OCC, wherein OCC is treated with floatation and enzymatic hydrolysis and those recycled stock is refined, thereby having the following effects:

a) The drainage property of base paper of old corrugated container is improved; and
b) The strength of the same is enhanced by the refining treatment of the fractionated long fiber only; and
c) The cost for disintegration and enzymatic treatment is reduced; and
d) The imported corrugated board and unbleached kraft pulp can be substituted by the Korean old corrugated container (KOCC).

6 Claims, No Drawings

METHOD FOR RECYCLING OF OLD CORRUGATED CONTAINER USING FLOTATION AND ENZYMATIC HYDROLYSIS

BACKGROUND OF THE INVENTION

1. Field of the Invention

The present invention relates to a method for recycling of old corrugated container (OCC) using flotation and enzymatic hydrolysis and more particularly, to a method for recycling of old corrugated containers enhancing strength without deteriorating drainage, wherein old corrugated containers are treated with floatation and enzymatic hydrolysis.

2. Description of the Prior Art

The total paper production of Republic of Korea amounted to 8 million tons in 1997, and hence Korea became one of the top 10 largest production countries in the world. The production of the base paper for corrugated board essential for packaging goods accounts for more than 30% of the total paper production. Corrugated board as packaging material has the advantage in that printing and processing are easy, the strength to weight ratio is excellent, and recycling is possible. At present, the recycling rate of used paper in Korea is the highest over the world, and in 1995, it was the highest among the top 10 largest paper production countries as 72% [*Vital Signs*, 1998]. Especially, the base paper of corrugated board is mainly produced from Korean old corrugated container (KOCC), and thus the recycling rate of KOCC is very high. However, there is a problem that the pulp quality is very low while the recycling rate of OCC is high.

The fines content in KOCC, the main source of the corrugated board, amounts to nearly the half of the total stock, and fines content increases as recycling process repeats due to the hornification of fiber. Generally, fines refer to inorganic materials and single fibers smaller than 72%, and they have been the main cause of the declination of productivity because they interfere dewatering of wet web in papermaking process of the base paper.

Meanwhile, there have been attempts to improve the drainage properties of OCC by increasing the headbox concentration of the paper machine or by applying drainage-promoting polymer additives. However, these conventional methods have problems of weakened paper strength and lowered surface properties caused by bad formation. Also, when considering the recent trend that the recycling rate of white water in papermaking process is blocked for water saving and environmental protection, the chemical and biological oxygen demand is likely to increase due to the accumulation of the additives in process water. Therefore, the decreased drainage properties caused by the fines in papermaking process for the base paper of corrugated board are inevitable in the conventional manufacturing technology, as far as KOCC is used for the source material. Thus the development of new environment-friendly paper recycling technology different from conventional one is keenly demanded.

In addition, the strength of base paper of corrugated board could not be increased in case KOCC is used for raw material, because the pump from KOCC has too much fines and contaminants. Although the separation technology of OCC with screen or cleaner to long and short fiber portions has been applied in developed countries [Bliss T., *Pump and Paper*, 88, 104 (1987); Clark L. E. and Iannazzi F. D., *Tappi*, 57, 59 (1974)], the said technology is only suitable for high quality OCC comprising good quality of unbleached kraft pulp and semi-chemical pulp. The strength of the base paper of the corrugated board can not be improved, in case low-quality OCC, having more fines content that long fiber portions, is used for main material of the corrugated board, as in Korea.

For this reason, high-quality base paper for corrugated board with excellent strength has been imported until now, and recently the imported amount of high quality base paper of corrugated board has increased rapidly from 166,000 tons in 1995 to 193,000 tons in 1996 [*Pulp & Paper International*, 39, 65 (1997)]. As mentioned above, there was no alternative other than using 100%-imported unbleached kraft pulp as raw material, and KOCC could not be used with the conventional technology. Actually, in 1996, the total quantity of unbleached kraft pulp imported for the manufacture of kraft paper and various corrugated board amounted to 270,000 tons [*Pulp & Paper International*, 39, 65 (1997)]. Accordingly, there is a serious demand for the development of new recycling technology which improves the productivity, enhances the strength, and reproduces to high-quality corrugated board by improving the drainage property of KOCC with high fines content.

SUMMARY OF THE INVENTION

As a result of earnest efforts to solve the said problems, the present invention was accomplished by confirming the improved drainage and strength properties of the base paper for corrugated board. When the large quantity of fines contained in KOCC are separated effectively with the flotation treatment, the fines are treated with novel enzyme treatment and the long fiber portion is refined.

Accordingly, an object of this invention is to provide a new environment-friendly method for recycling OCC enhancing the flexibility of fiber without deteriorating the drainage property of OCC pulp, and ultimately increasing the productivity of manufacturing the base paper for corrugated board as well as improving the main physical properties such as burst strength, compression strength, etc..

DETAILED DESCRIPTION OF THE INVENTION

The present invention is a method for recycling OCC comprising the following process:

(a) A process wherein OCC is treated with floatation; and (b) A process wherein the reject portion containing fines separated in the said floatation treatment process is treated with polysaccharide hydrolase; and (c) A process wherein the long fiber portion from the said floatation process is refined.

Hereunder is given a detailed explanation of each process of the present invention.

This invention is highly characterized by using floatation treatment applied commonly in the deinking process of printedwaste for separation of OCC fines.

The floatation treatment in a deinking process is conducted in order to separate the ink particles with different fiber and surface properties from the stock. Although various kinds of deinking agents must be added for this flotation in deinking process to decrease the flotation of wood fiber and promote desorption of ink particles and formation and stabilization of foams, the flotation process for OCC according to the present invention is fundamentally different from the flotation in a deinking process, in that it is conducted for the separation purpose only on the basis of size of fibers which has the same surface property without any chemical additives under relative low flow rate and air flux condition. This is the excellence of the present invention.

The flotation treatment according to the present invention is carried out preferably under the condition of 0.5–2.0% OCC concentration, a temperature range of 20–55° C., a flow rate of 10–50 L/min, and an air flux of 5–20 L/min, and fines cannot be separated effectively if the flotation treatment is carried out outside the above limiting ranges.

Meanwhile, if the reject separated in a concentrated state in flotation treatment is left in the stock, it induces serious drainage load and increases the contamination of the process water and the amount of waste. This problem is prevented in this invention by selective enzymatic treatment to the reject separated from the said flotation stage.

In the polysaccharide hydrolase treatment according to this invention, fines originating from natural corn starch adhesive of corrugated part inside OCC and wood fines are hydrolyzed. Since this hydrolase treatment is partially applied only to the concentrated reject portion, it is very effective in comparison with the conventional enzymatic method applied to the whole stock and has advantage of saving the treatment cost due to the decrease of enzyme input amount. Additionally, since the drainage property is remarkably enhanced as a result of hydrolase treatment, there is no need of additional input of drainage-promoting chemical additives. Therefore, the deteriorating the formation of base paper of corrugated board due to the use of drainage-promoting chemical additives does not matter any more, and the contamination of the process water can also be prevented.

Mixed enzyme of amylase, cellulase and hemicellulase are used as polysaccharide hydrolase in this invention and the treatment is preferred to be in the temperature range of 20–55° C. Amylase is used to decompose natural corn starch adhesive and preferred to be treated in the range of 0.01–0.06 weight % with respect to the reject portion in the flotation process. Cellulase and hemicellulase are used to decompose the fines originating from wood fiber and preferred to be treated in the range of 0.01–0.1 weight % with respect to the reject portion in the said flotation process. In enzymatic treatment, if the amount of enzyme is too small the starch adhesives and fines can not be decomposed effectively, and if it is too large the fines elimination effect by enzymatic treatment is not to be offset by the enzyme input costs.

Also, in this invention, the refining is conducted selectively to the long fiber portion. The same is conducted for the purpose of recovering the flexibility of fiber which is at a very inflexible state due to the hornification caused by repeated recycling treatment. In the refining process of this invention, the floatated long fiber portion is concentrated to the range of 2–6% consistency and then refined under a temperature condition of 20–70° C. In case the refining is performed outside the said limiting ranges, effective refining of fiber is impossible due to excessive cutting of fiber and etc.. Meanwhile, if the stock which did not go through the flotation process is refined, the drainage time of the stock increases rapidly so that sufficient mechanical treatment becomes impossible. However, in the case of the flotation process according to this invention, the drainage property is not lowered so that sufficient pulverization is possible, whose result is that the strength of base paper for corrugated board is not decreased.

As explained above, in this invention the hydrolysis effect is maximized by the selective polysaccharide hydrolysis of the reject portion only separated from the flotation process of OCC. Also the strength is increased without lowering the drainage property by selective refining of the long fiber portion with the fines separated. So it is especially useful for the recycling of Korean old corrugated contained (KOCC).

The following specific examples are intended to be illustrative of the invention and should not be construed as limiting the scope of this invention as defined by the appended claims.

EXAMPLE 1

After picking the bottom stock of testliner from the headbox in the production line of two-ply base paper for corrugated board, 17% of the reject was separated by 2-minute flotation treatment under the condition of 1% concentration, 45° C. of temperature, 30 L/min of flow rate and 15 L/min of air flux using E-type laboratory flotation cell (Voith, Germany).

In order to decompose fiber fines and adhesive starch of the separated reject which was concentrated to 3%, 0.05 weight % of cellulase and hemicellulase enzyme complex separated and refined from *Trichoderma longibrachiatum* (Pergalase FL-60, Genencor, Finland) and 0.03 weight % of α-amylase family enzyme separated and refined from *Bacillus licheniformis* (Termamyl LS, Novo, Denmark; 1,4-α-D-glucan-glucano-hydrolase) was added and ripened with slow agitation for 1 hour at 45° C. Subsequently, the stock was prepared by mixing the fines hydrolyzed by the enzymes with long fiber portion, and then the handsheet was prepared with a basis weight of 150 g/m$^2$ according to TAPPI Standard Test Method T-205 om-88.

EXAMPLE 2

Flotation and polysaccharide hydrolase treatment was performed in the same manner as in Example 1. Subsequently, the flotated long fiber portion was concentrated to 4%, and refined 2 times at 45° C. using Disk Refiner (Daeil Khigong Co., Korea). And then, the refined stock was diluted again to 1% concentration with white water taken from the concentration process, and mixed with hydrolyzed fines and handsheeted with a basis weight of 150 g/m$^2$ according to TAPPI Standard Test Method T-205 om-88.

COMPARATIVE EXAMPLE 1

After picking the bottom stock of testliner from the headbox in the production line of two-ply base paper for corrugated board, the same was handsheeted with a basis weight of 150 g/m$^2$ according to TAPPI Standard Test Method T-205 om-88.

COMPARATIVE EXAMPLE 2

After picking the bottom stock of testliner from the headbox in the production line of two-ply base paper for corrugated board, the same was concentrated to 4%, and refined 2 times at 45° C. using Disk Refiner (Daeil Khigong Co., Korea). Subsequently, the refined stock was diluted again to 1% concentration with white water taken from the concentration process, and then, the same was handsheeted with a basis weight of 150 g/m$^2$ according to TAPPI Standard Test Method T-205 om-88.

EXPERIMENTAL EXAMPLE

In order to confirm the various physical property changes of OCC caused by the hydrolase treatment to the fines separated by flotation treatment, the drainage time in the papermaking process was compared with Example 1 and Comparative example 1. Burst strength and compression strength of the handsheet were also measured according to TAPPI Standard Test Methods T-403 om-85 and T-818 om-87, respectively. The results are given in Table 1.

Also, in order to confirm the various physical property changes of OCC caused by the refining to the long fiber portion treatment, drainage time in the papermaking process was compared with Example 2 and Comparative Example 2. Burst strength and compression strength of the handsheet were also measured according to TAPPI Standard Test Methods T-403 om-85 and T-818 om-87, respectively. The results are given in Table 2.

TABLE 1

|  | Example 1 | Comparative example 1 |
| --- | --- | --- |
| Drainage time (sec) | 149.8 | 196.6 |
| Compression strength (N) | 125.1 | 118.5 |
| Burst strength (kPa · m²/g) | 1.82 | 1.80 |

TABLE 2

|  | Example 2 | Comparative example 2 |
| --- | --- | --- |
| Drainage time (sec) | 197.9 | 245.3 |
| Compression strength (N) | 143.6 | 137.5 |
| Burst strength (kPa · m²/g) | 2.35 | 2.22 |

As can be confirmed in Table 1 and 2, the selective polysaccharide hydrolase treatment to reject separated by flotation treatment of KOCC had the effect of reducing drainage time more than 23%, and saved the enzyme input cost more than 80%, in comparison with the conventional enzyme treatment. The reason of this reduction in drainage time is that fines of corn starch adhesive and wood fiber present in OCC pulp and hindering drainage were cleared by flotation treatment and then eliminated by effective enzymatic hydrolysis.

Meanwhile, Example 1 wherein long fiber content increased relatively since the content of the fines inducing drainage load of OCC decreased by the floatation treatment according to the recycling method of this invention. The result shows increased strength of used papermaking stock in comparison with Comparative example 1, however the extent of the increase was insignificant, and the strength could not be sufficiently enhanced by enzyme treatment only.

On the contrary, it was confirmed that when examining the measured values of Example 2 and Comparative example 2, wherein the refining was conducted to enhance the strength of handsheet, the compression strength and burst strength increased by more than 20% and 30%, respectively, in comparison with those of Example 1 and Comparative example 1. Especially Example 2 comprising preceding flotation treatment followed by polysaccharide hydrolase treatment for the reject portions had the effect of saving refining power more than 20% and improving drainage property and strength. In addition, it was confirmed from the drainage time measurement results of Comparative example 2 that if flotation and hydrolase treatments are not preceded, the refining induces rapid increase of drainage time and then it cannot be applied to the actual papermaking process.

As stated in detail and proved above, the present invention provides a recycling method of OCC by flotation treatment and followed by selective treatment of enzyme and refining. The recycling method of OCC of the present invention has the following advantages compared with the conventional recycling method:

(a) The drainage property is improved by separating and removing the fines in KOCC without adding any chemical additives; and (b) The strength is enhanced by refining for the fractionated long fiber portion only; and (c) The refining power and enzyme treatment cost are saved; and (d) The imported OCC and unbleached kraft pulp required for the manufacture of high-strength base paper for corrugated board could be replaced by KOCC.

What is claimed is:

1. A method for recycling of old corrugated container stock comprising:
   a) subjecting said container stock to a flotation treatment process comprising the steps of:
      i) loading said stock and water into a flotation cell to form a stock concentrate, said stock concentrate comprising long fibers, fiber fines, and adhesive starches,
      ii) aerating said stock concentrate to form a long fiber portion and a floated fines portion, said long fiber comprising said long fibers, and said floated fines portion comprising said fines and said adhesive starches,
      iii) maintaining the temperature of said stock concentrate in the flotation cell within a constant range,
      iv) separating said floated fines portion from said long fiber portion by removing said floated fines portion from said flotation cell;
   b) subjecting said floated fines portion to a polysaccharide hydrolase treatment process to hydrolyze said fines and said adhesive starches; and
   c) subjecting said long fibers to a refining process comprising the steps of:
      (i) placing said long fibers into a refiner,
      (ii) maintaining the temperature of said long fibers in the refiner within a constant range,
      (iii) treating said long fibers to make them more flexible.

2. The method for recycling old corrugated container stock according to claim 1 wherein said flotation treatment process, (a), is conducted under the conditions of: 0.5–2.0% stock concentration, 20–55° C. temperature range, 10–50 L/min flowrate, and 5–20 L/min air flux rate.

3. The method for recycling of old corrugated container stock according to claim 1, wherein said polysaccharide hydrolase treatment process, (b), is conducted under the conditions of: adding 0.01–0.1 weight % of cellulose and hemicellulose, adding 0.01–0.06 weight % of amylase and maintaining the stock temperature range between 20–50° C.

4. The method for recycling of old corrugated container stock according to claim 1, wherein, said refining process, (c), is conducted under the temperature range of 20–70° C.

5. The method for recycling of old corrugated container stock according to claim 1, wherein, said long fibers from said flotation treatment process are concentrated to 2–6%.

6. A method for recycling of old corrugated container stock comprising:
   a) subjecting said container stock to a flotation treatment process comprising the steps of:
      (i) loading said stock and water into a flotation cell to form a stock concentrate, said stock concentrate comprising long fibers, fines, and adhesive starches, wherein, the stock is concentrated to 0.5–2.0% and the loading flowrate is 10–50 L/min, (ii) aerating said stock concentrate to form a long fiber portion and a floated fines portion, said long fiber portion comprising said long fibers, and said floated fines portion comprising said fines and said adhesive starches, wherein, the aeration rate is 5–20 L/min,
(iii) maintaining the temperature of said stock concentration in the flotation cell with a constant range of 20–55° C.,
(iv) separating said floated fines portion from said long fiber portion by removing said floated fines portion from said flotation cell;

b) subjecting said floated fines portion to a polysaccharide hydrolase treatment process to hydrolyze said fines and said adhesive starches; said polysaccharide hydrolase treatment process further comprises, (i) adding 0.01–0.06 weight percent of amylase to said floated fines portion,
(ii) adding 0.01–0.1 weight percent of cellulase and hemicellulase to said floated fines portion,
(iii) maintaining said floated fines portion temperature range from 20–50° C., c) subjecting said long fibers to a refining process comprising the steps of:
(i) concentrating said long fibers to 2–6 percent,
(ii) placing said long fibers into a refiner,
(iii) maintaining the temperature of said long fibers in the refiner in the range of 20–70° C.,
(iii) treating said long fibers to make them more flexible.

* * * * *